(12) United States Patent
Radu et al.

(10) Patent No.: US 7,192,070 B2
(45) Date of Patent: Mar. 20, 2007

(54) VEHICLE CONSOLE WITH ARMREST EXTENSION

(75) Inventors: Bogdan Radu, Dearborn, MI (US); Alan G. Dry, Grosse Point Woods, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/996,190

(22) Filed: Nov. 22, 2004
(Under 37 CFR 1.47)

(65) Prior Publication Data

US 2006/0108816 A1    May 25, 2006

(51) Int. Cl.
*B60R 27/00* (2006.01)
(52) U.S. Cl. .................. 296/24.34; 296/37.8; 296/1.09
(58) Field of Classification Search ............ 296/24.34, 296/37.8, 1.09; 297/411.21, 411.32, 411.3
See application file for complete search history.

(56) References Cited

U.S. PATENT DOCUMENTS

| | | | | |
|---|---|---|---|---|
| 3,356,409 | A | * | 12/1967 | Belsky et al. ............ 296/24.34 |
| 4,052,103 | A | | 10/1977 | Steinthal |
| 4,453,759 | A | * | 6/1984 | Kathiria ..................... 296/37.8 |
| 4,674,790 | A | | 6/1987 | Johnson |
| 4,818,008 | A | * | 4/1989 | Cressoni ..................... 296/37.8 |
| 4,878,438 | A | | 11/1989 | Carver |
| 4,984,847 | A | | 1/1991 | Bedu et al. |
| 5,248,183 | A | | 9/1993 | Gignac et al. |
| 5,749,629 | A | | 5/1998 | Heath et al. |
| 5,788,324 | A | | 8/1998 | Shea et al. |
| 5,845,965 | A | | 12/1998 | Heath et al. |
| 5,947,554 | A | | 9/1999 | Mashkevich |
| 6,203,088 | B1 | | 3/2001 | Fernandez et al. |
| 6,283,551 | B1 | | 9/2001 | Bergin |
| 6,419,314 | B1 | * | 7/2002 | Scheerhorn ............ 297/188.19 |
| 6,719,343 | B2 | | 4/2004 | Emerling et al. |
| 6,719,367 | B2 | * | 4/2004 | Mic et al. ............... 297/188.19 |
| 6,736,438 | B1 | * | 5/2004 | Wieclawski ................. 296/24.3 |
| 6,739,669 | B2 | | 5/2004 | Etzioni et al. |
| 6,761,278 | B2 | * | 7/2004 | Hyp et al. ................ 220/254.2 |
| 2002/0057002 | A1 | * | 5/2002 | Pegorier ..................... 296/37.8 |
| 2002/0140246 | A1 | * | 10/2002 | Worrell et al. ............. 296/37.8 |
| 2003/0047955 | A1 | * | 3/2003 | Bruhnke et al. ........... 296/37.8 |
| 2003/0155787 | A1 | * | 8/2003 | Lein et al. .................. 296/24.1 |
| 2003/0184133 | A1 | | 10/2003 | Mic et al. |
| 2003/0218373 | A1 | | 11/2003 | Etzioni et al. |
| 2004/0094587 | A1 | | 5/2004 | Harden et al. |
| 2004/0217615 | A1 | * | 11/2004 | Lindstrom et al. ........ 296/24.34 |
| 2005/0230993 | A1 | * | 10/2005 | Dry ........................... 296/37.8 |

FOREIGN PATENT DOCUMENTS

| | | |
|---|---|---|
| DE | 30 46 049 A1 | 7/1982 |
| DE | 43 40 516 A1 | 6/1995 |
| DE | 101 10 330 A1 | 10/2002 |

(Continued)

*Primary Examiner*—Dennis H. Pedder
(74) *Attorney, Agent, or Firm*—MacMillan, Sobanski & Todd, LLC

(57) ABSTRACT

A console for a vehicle includes a body defining a compartment and an opening therein. The console further includes a lid configured to cover the opening. The lid includes an armrest portion. A separate armrest extension is movably mounted relative to the body and the lid, wherein the armrest extension is movable between a storage position and a deployed position.

19 Claims, 4 Drawing Sheets

FOREIGN PATENT DOCUMENTS

| | | |
|---|---|---|
| DE | 102 12 944 A1 | 10/2002 |
| EP | 1048515 * | 11/2000 |
| FR | 2 749 233 A1 | 12/1997 |
| JP | 57-164821 A | 10/1982 |
| JP | 9-295542 * | 11/1997 |
| WO | WO 95/00360 | 1/1995 |

* cited by examiner

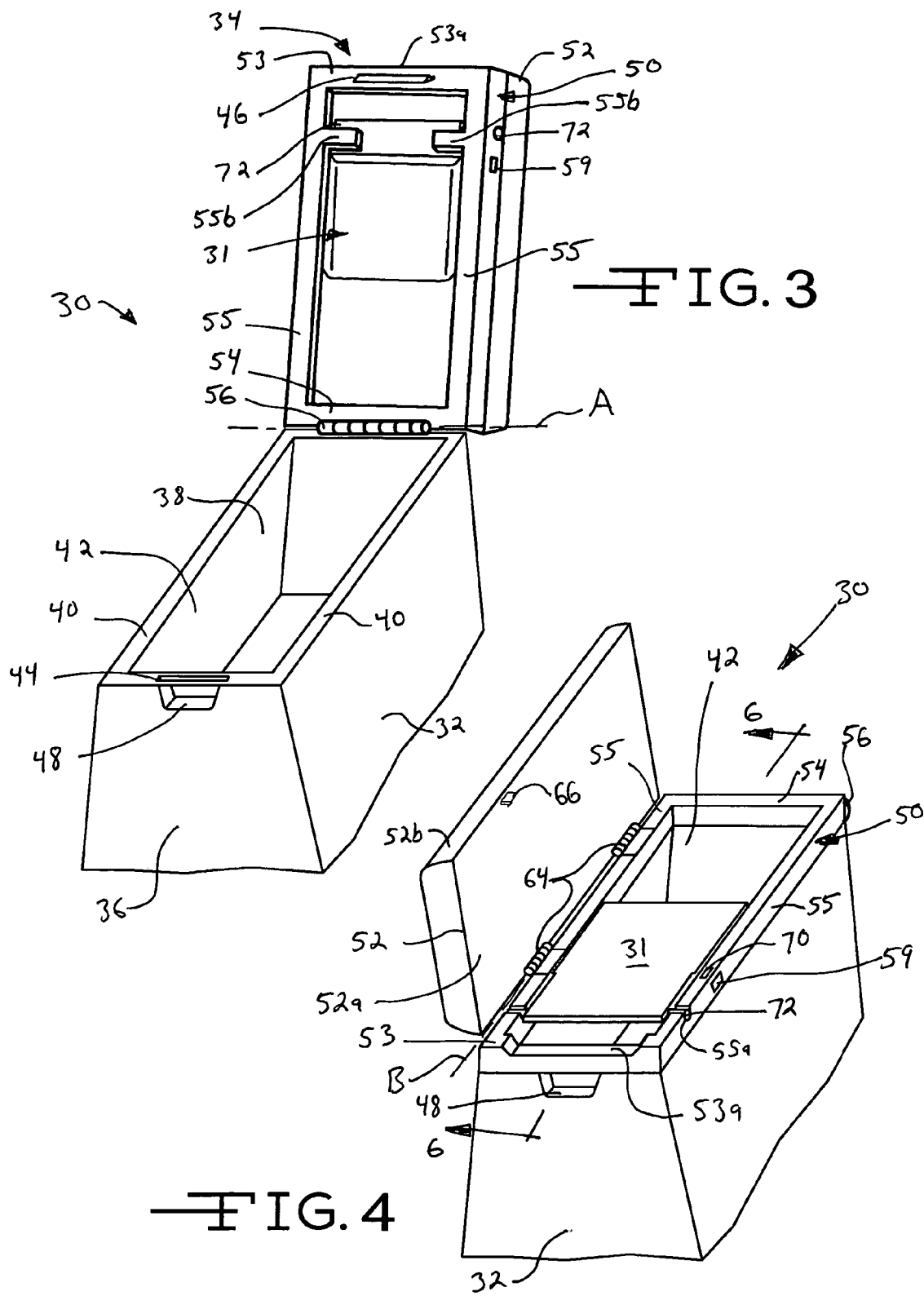

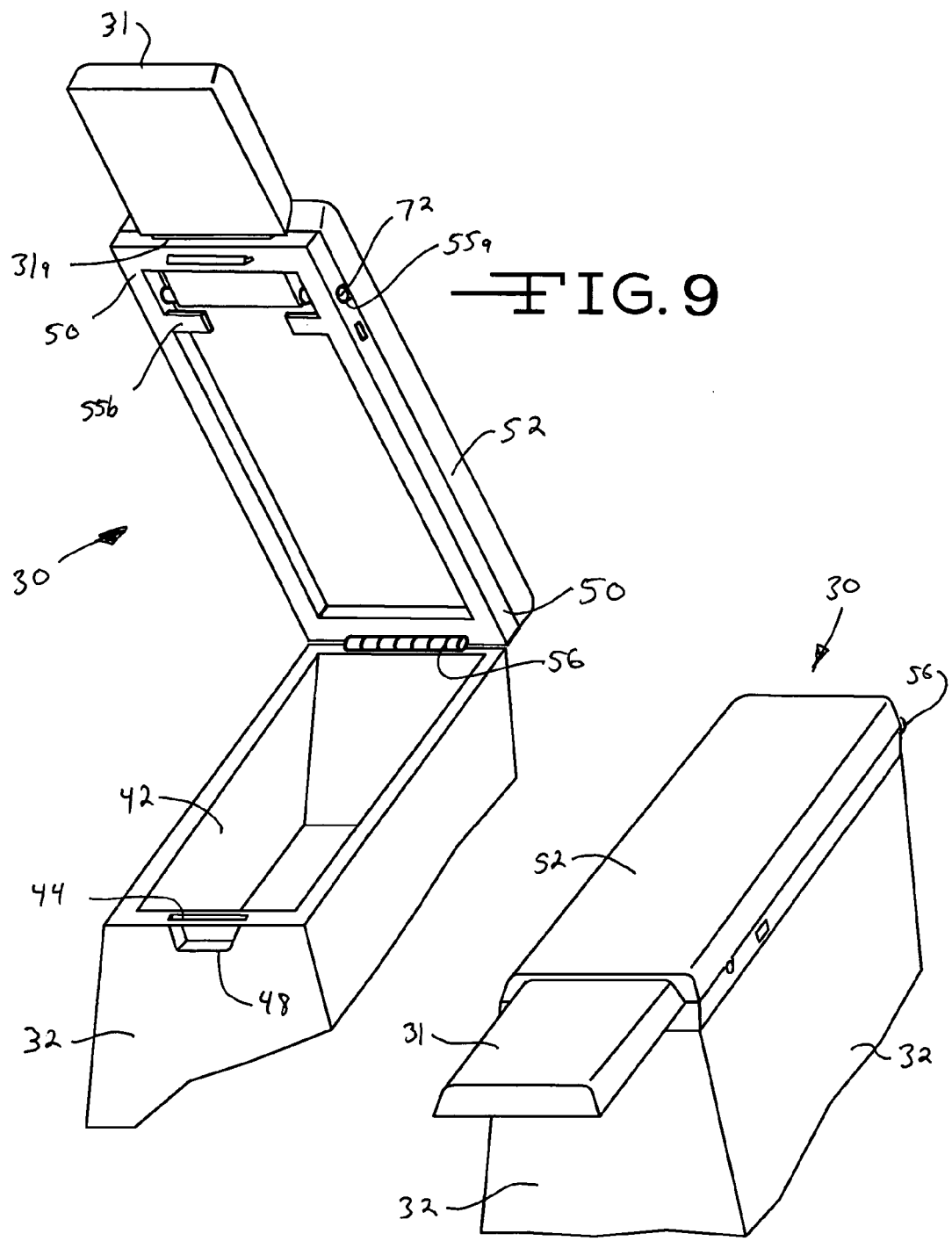

VEHICLE CONSOLE WITH ARMREST EXTENSION

BACKGROUND OF THE INVENTION

Vehicle interiors typically include a variety of decorative and functional trim panels. For example, the front area of the interior of a vehicle, includes an instrument panel, typically formed of a molded plastic material. Many vehicles may also include a center console located between the driver and passenger seats for use as an armrest and for storage and placement of various articles. The center console is generally stationary mounted within the cockpit area of the vehicle. Therefore, when the driver or passenger seat is adjusted forward, the center console is often difficult to access, particularly for use as an armrest. It would therefore be advantageous if there could be developed a center console that provides improved access to the console for use as an armrest when the driver and/or passenger seat is in the forward position.

SUMMARY OF THE INVENTION

The present invention relates to a console for a vehicle. The console includes a body that defines a compartment opening therein. A lid covers the compartment opening of the body of the console. The lid includes an armrest portion thereon. The console also includes a separate armrest extension that is movably mounted relative to the body and the lid. The armrest extension is movable between a storage position and a deployed position.

Other advantages of this invention will become apparent to those skilled in the art from the following detailed description of the invention, when read in light of the accompanying drawings.

BRIEF DESCRIPTION OF THE DRAWINGS

FIG. 3 is a front perspective view of the console according to the present invention illustrating the lid assembly in an open position and the armrest extension in the stored position.

FIG. 4 is a front perspective view of the console according to the present invention illustrating the armrest portion of the lid assembly in an open position.

FIG. 8 is a perspective view of the console illustrating the armrest extension in the deployed position, and the lid in the closed position.

FIG. 9 is a perspective view of the console illustrating the lid assembly in the open position with the armrest extension in the deployed position.

DETAILED DESCRIPTION OF THE INVENTION

Figure 1:
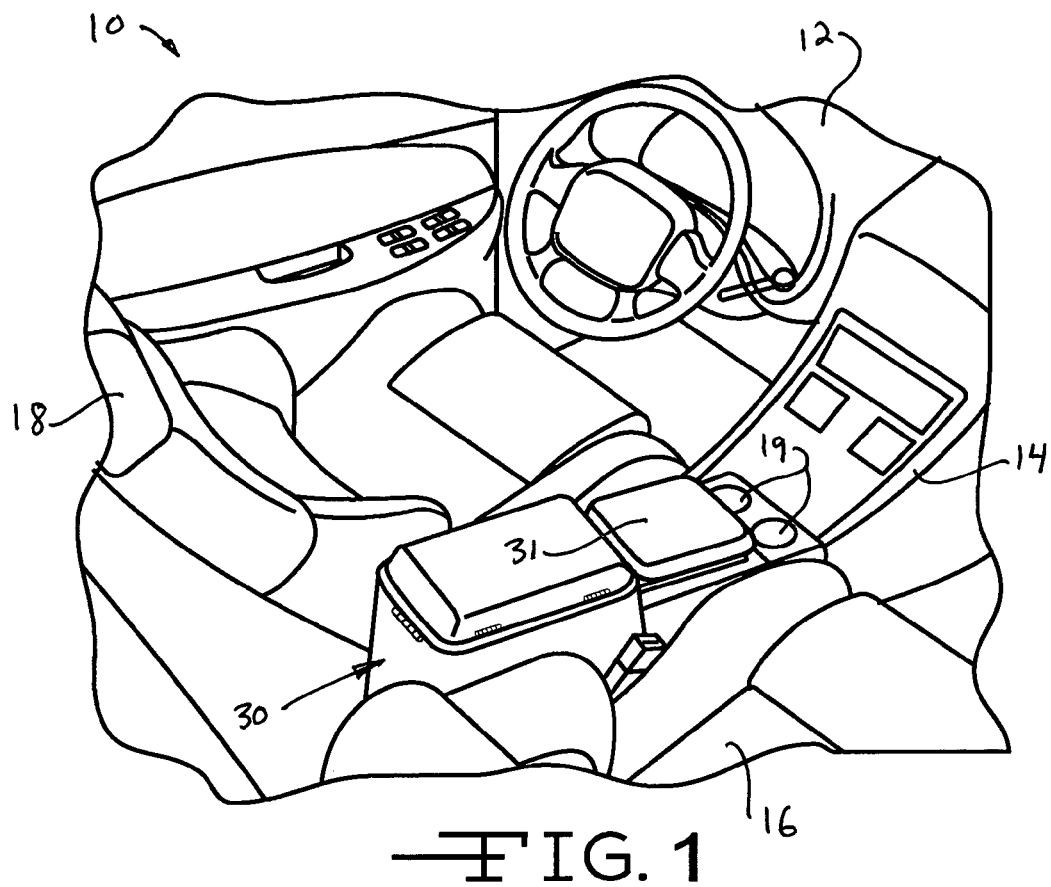
FIG. 1 is a rear view of the interior of a passenger compartment of a vehicle having a console according to the present invention illustrating the flip forward armrest extension in the deployed position.

Referring now to the drawings, there is illustrated in FIG. 1 a portion of an interior passenger compartment of a vehicle, indicated generally at 10. The illustrated vehicle interior passenger compartment 10 is, in large measure, conventional in the art and is intended merely to illustrate one environment in which this invention may be used. Thus, the scope of this invention is not intended to be limited for use with the specific structure for the vehicle interior passenger compartment illustrated in FIG. 1 or with vehicle interior passenger compartments in general. On the contrary, as will become apparent below, this invention may be used in any desired environment for the purposes described below.

The vehicle interior passenger compartment 10 includes an instrument panel or dashboard 12. Positioned within the instrument panel 12 are various visual gauges for the driver's convenience, and various temperature and climate controls. Other controls, storage compartments and stereo controls may be positioned within the instrument panel 12 or within a central panel 14. The central panel 14 is generally positioned adjacent to the instrument panel 12 and is located between a passenger seat 16 and a driver seat 18. Examples of such storage compartments and controls that may be included in the central panel 14 are one or more cupholders 19. A glove box (not shown) may also be located within the passenger compartment 10. The compartment 10 may also include an emergency brake control handle (not shown) underneath the deployed armrest extension 31, as will be discussed below.

A center console, indicated generally at 30, is included within the interior passenger compartment 10 of the vehicle. The console 30 can be used for any suitable purpose, such as operating as a storage compartment and/or serving as an armrest. The console 30 is generally located between the passenger seat 16 and the driver seat 18. The console 30 may be either fixedly or removably mounted within the interior passenger compartment 10. Regardless of how the console 30 is mounted, the mounted console 30 preferably remains stationary relative to the passenger seat 16 and the driver seat 18. The driver seat 18 and passenger seat 16 are generally movable forward and rearward within the interior passenger compartment 10 to accommodate drivers and passengers of varying sizes and heights.

According to the present invention, the console 30 includes a separate armrest extension 31. The armrest extension 31 is movably mounted relative to the console 30. The armrest extension 31 is movable such that it may be stowed in a storage position within the console 30 or may be positioned in a deployed position. As shown in FIG. 1, the armrest extension 31 extends over the central panel 14 in the deployed position, but still allows access to the various controls and storage compartments located on the central panel 14. The armrest extension 31 provides an additional surface for the driver and/or passenger to use as an armrest. This additional armrest surface (i.e. the armrest extension 31) is particularly useful when the driver/passenger seats 16, 18 are positioned in their forward positions because in the forward positions, the console 30 is generally inaccessible to the driver/passenger for use as an armrest. The armrest extension 31 will be discussed in greater detail below.

Figure 2:
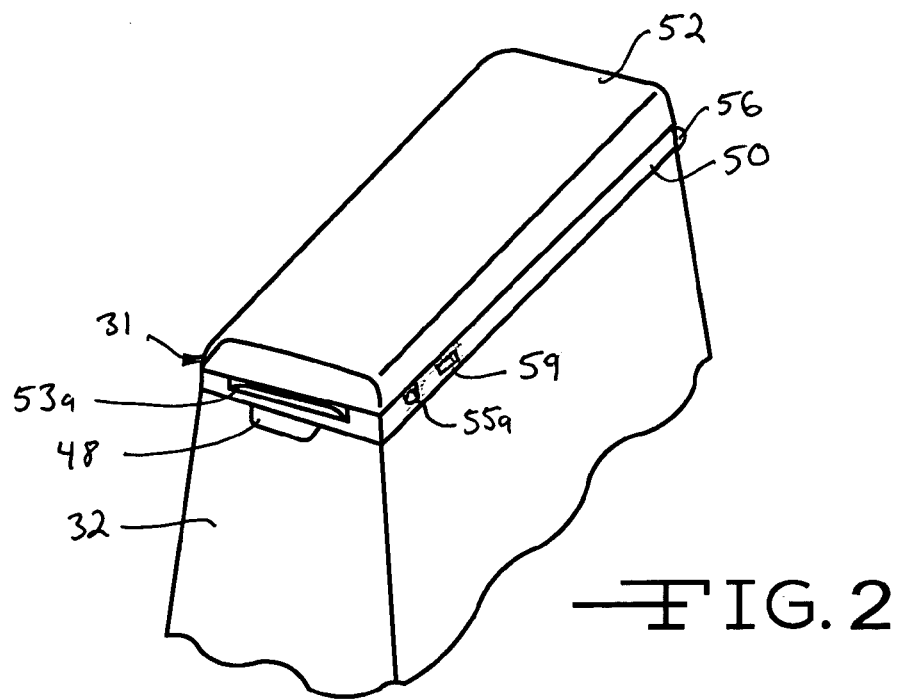
FIG. 2 is a front perspective view of the console according to the present invention illustrating the lid assembly in the closed position.

FIGS. 2 through 9 illustrate the console 30 of the present invention. FIG. 2 illustrates the general structure of the console 30, which includes a body 32 and a lid, indicated generally at 34. As shown in FIG. 3, the body 32 is comprised of a forward portion 36 and a rearward portion 38 connected by two opposing side portions 40. The component portions 36, 38, 40 of the body 32 define an opening and a compartment, collectively referred to as 42, in the body 32. The components 36, 38, 40 of the body 32 are preferably configured such that the body 32 is rectangular in shape; however, it will be appreciated that the body 32 may also be of any other suitable shape. The body 32 can be formed from any suitable substantially rigid material, such as plastic. Examples of such suitable materials for the body 32 include polypropylene, nylon, acrylonitrile butadiene styrene (ABS), and polycarbonate acrylonitrile butadiene styrene (PCABS).

The body 32 may also include a latch aperture 44. The latch aperture 44 is included to receive a latch mechanism 46 mounted on the lid 34. The latch aperture 44 is preferably formed into the upper surface of the forward portion 36 of the body 32, although it will be appreciated that the latch aperture 44 can be located at any suitable location on the body 32 to correspond to the location of the latch mechanism 46 on the lid 34. Thus, the console 30 is generally defined having a body 32, a lid 3 and an armrest extension 31.

The latch aperture 44 can be of any suitable shape to receive the latch mechanism 46. A release aperture 48 located adjacent to the latch aperture 44 may also be included on the body 32. The release aperture 48 provides access to the latch mechanism 46 when the latch mechanism 46 is locked into the latch aperture 44 (i.e. the lid 34 is in the closed position), and allows an operator to release the latch 46 to open the lid 34. The release aperture 48 is also preferably located on the forward portion 36 of the body 32 so as to correspond with the location of the latch aperture 44 and the latch mechanism 46. It will be appreciated, however, that the release aperture 48 can be located at any suitable location on the body 32 to correspond to the location of the latch aperture 44 and the latch mechanism 46. The release aperture 48 may also include a release mechanism (not shown), such as a push button or lever, to facilitate the release of the latch mechanism 46 from the latch aperture 44, although such is not required.

The lid 34 of the console 30 is configured to cover the opening 42 of the body 32. FIGS. 3 and 4 show a preferred embodiment of the lid 34 where the lid comprises a frame, indicated generally at 50, and an armrest portion 52. The lid 34 is preferably hingedly or pivotally connected to the rearward portion 38 of the body 32 about a pivot axis A. The frame 50 of the lid 34 comprises a forward frame portion 53 and a rearward frame portion 54 connected by a pair of opposing side frame portions 55. Preferably, a hinge 56 connected at an upper edge of the rearward portion 38 of the console body 32 connects the rearward frame portion 54 of the frame 50 to the body 32. It will be understood, however, that the lid 34 can be hingedly or pivotally connected at any suitable location on the frame 50 or on the lid 34 to any suitable location of the body 32 and can be connected by any number of hinging or pivoting means. The lid 34 can also be movably connected to the console body 32 by any other desired means.

The component frame portions 53, 54, 55 define an opening, or open cavity, in the frame 50. The opening in the frame 50 provides access to the compartment 42 of the body 32. The component frame portions 53, 54, 55 are preferably configured such that the frame 50 is rectangular in shape and such that the frame 50 is generally the same size as the compartment opening 42. It will be appreciated, however, that the frame 50 may be of any suitable shape and size that conforms to the shape of the compartment opening 42 of the body 32.

The forward frame portion 53 of the frame 50 preferably includes a notch 53a in the upper surface thereof. The notch 53a can have any suitable configuration to receive the armrest extension 31 when the armrest extension is in the deployed position. In a preferred embodiment, the depth of the notch 53a is approximately one half of the depth of the forward frame portion 53. The armrest extension 31 and the operation thereof will be discussed in greater detail below.

The lid 34 may also include one or more stop tabs 55b to support the armrest extension 31 when the armrest extension 31 is in the storage position. Preferably, the stop tab(s) 55b are located on each of the side frame portions 55 of the frame 50. FIG. 3 shows each side frame portion 55 containing one stop tab 55b. The stop tabs 55b can have any shape and are disposed generally perpendicular to the side frame portion 55 into the open cavity formed by the frame 50. The stop tab(s) 55b may also be positioned at any suitable location on the lid 34 other than the frame 50 and may be oriented in any suitable direction to support the armrest extension 31 while in the storage position. It will be appreciated that the lid 34 or frame 50 can include any suitable number or stop tabs 55b of any suitable shape to maintain the armrest extension 31 in the storage position. It will also be appreciated that the stop tabs 55b may be omitted from the lid 34 or frame 50 altogether, thus allowing the armrest extension 31 to rest against the forward portion 36 of the body 32 in an alternate storage position (not shown).

Figure 7:
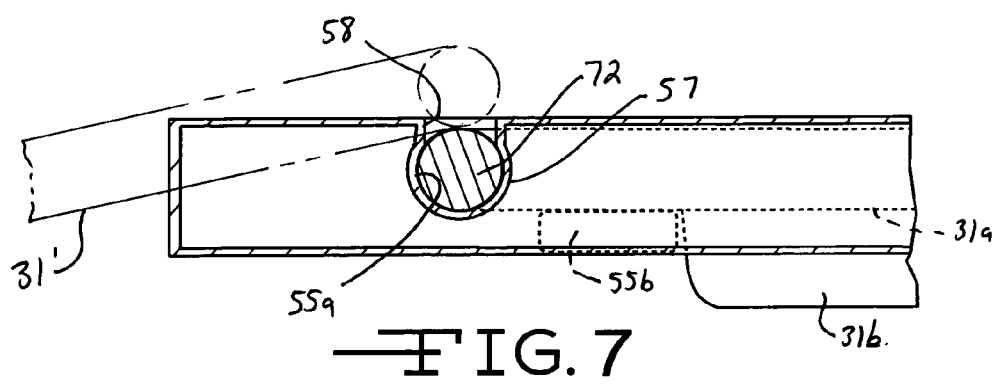
FIG. 7 is an enlarged cross-sectional view of the hinge point connecting the armrest extension to the lid assembly taken along Line 7—7 shown in FIG. 5.

Each of the side frame portions 55 also include a hinge mounting aperture 55a for pivotally receiving a pivot member 72 of the armrest extension 31. The hinge mounting apertures 55a are preferably located on each side frame portion 55 adjacent to the forward frame portion 53 of the lid 34. FIG. 7 shows a preferred embodiment of the hinge mounting aperture 55a where the hinge mounting aperture 55a includes a mounting portion 57 that is cylindrical in shape and extends through the side frame portion 55 of the frame 50. The mounting portion 57 of the hinge mounting aperture 55a is preferably recessed within the side frame portion 55 relative to the top surface of the side frame portion 55. A generally rectangular shaped, collar opening 58 extends through the side frame portion 55 and is disposed above the mounting portion 57 so as to provide access from the top surface of the side frame portion 55 to the recessed mounting portion 57. The width of the collar opening 58 is preferably slightly smaller than the diameter of the pivot member 72 of the armrest extension 31 to provide an interference fit. The size and shape of the collar opening 58 allows for a break away pivot position for the armrest extension 31 relative to the body 32, which will be discussed in greater detail below. It will be appreciated, however, that the hinge mounting aperture 55a can be of any suitable configuration to receive the pivot member 72 of the armrest extension 31 as well.

The armrest portion 52 of the lid 34 is preferably connected to the frame 50. FIG. 4 shows the armrest portion hingedly connected to one of the side portions 55 of the frame 50 about a pivot axis B. The armrest portion 52 of the lid 34 is shown hingedly connected to one of the frame side portions 55 by a plurality of hinges 64. It will be understood however, that the armrest portion 52 can be hingedly or pivotally connected at any suitable location to the frame 50 and can be connected by any number of hinging or pivoting means. The armrest portion 52 can also be movably connected to the frame 50 by any other desired means.

The armrest portion 52 is preferably constructed including a body having a substrate 52a formed of plastic material, such as acrylonitrile butadiene styrene (ABS) or glass-filled polypropylene. The armrest portion 52 further includes an outer surface or skin 52b. Preferably, the skin 52b is formed of plastic material, such as vinyl or thermoplastic olefin (TPO). The armrest portion 52 is preferably sized having any suitable dimensions to cover the frame 50 of the lid 34. The armrest portion 52 may also be of any suitable constructed thickness to serve as a comfortable armrest. It will be appreciated, however, that the armrest portion 52 may be constructed having any suitable dimensions, any suitable construction, and using any suitable materials other than the sizes, construction, and materials discussed above.

Referring back to FIGS. 2 through 4, the armrest portion 52 also includes an armrest latch 66 preferably located on the bottom surface of the body substrate 52a. The armrest latch 66 is used to secure the armrest portion 52 to the frame 50 when the armrest portion 52 is in the closed position. The armrest latch 66 is received into an armrest latch aperture 70 located on the frame 50 to secure the armrest portion 52 in the closed position. The armrest latch aperture 70 is preferably located on the side frame portion 55 of the frame 50 opposite the hinge connection point(s) 64 of the armrest portion 52 to the frame 50. It will be appreciated that the armrest latch aperture 70 can also be located at any other suitable point on the frame 50. In conjunction, the armrest latch 66 may be located at any point on the body substrate 52a that corresponds to the location of the armrest latch aperture 70 on the frame 50. An armrest release 59 is preferably located adjacent to the armrest latch aperture 70. The armrest release 59 allows the operator to release the armrest portion 52 to expose the opening of the frame 50 and the open compartment 42 of the body 32. The armrest release 59 may be any suitable mechanism suitable for releasing the armrest latch 66 from the armrest latch aperture 70, such as a push button. The armrest release 59 is also preferably located on the side frame portion 55 of the frame 50 opposite the hinge connection point(s) 64 of the armrest portion 52 to the frame 50. It will be appreciated that the armrest release 59 can also be located at any other suitable point on the frame 50 that corresponds to the location of the armrest latch aperture 70.

Figure 6:
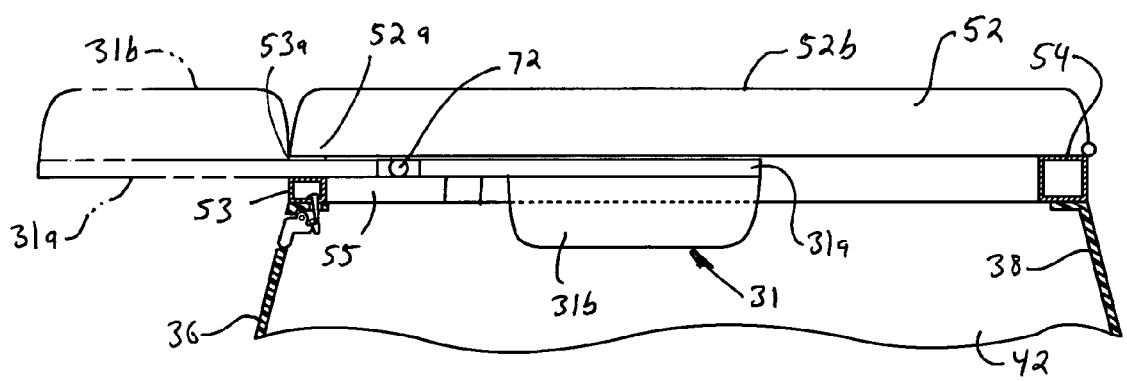
FIG. 6 is an enlarged cross-sectional view of the lid assembly taken along Line 6—6 shown in FIG. 4.

According to the present invention, the console 30 includes a separate armrest extension 31. FIG. 6 illustrates the armrest extension 31, which is comprised of a support member 31a and a cushion portion 31b. The support member 31a preferably extends the entire length of the armrest extension, and the cushion portion 31b is preferably mounted at one end of the support member 31a. The support member 31a is preferably rectangular in shape, and is sized so that the armrest extension 31 fits within the open cavity formed by the frame 50. The support member 31a also includes a pivot member 72 located at the end of the support member 31a opposite the end where the cushion portion 31b is located. The pivot member 72 extends beyond the edges of the support member 31a such that a portion of the pivot member extends on either side of the support member 31a. The pivot member 72 is designed to engage the hinge mounting apertures 55a of the frame 50 so as to movably mount the armrest extension 31 to the frame 50. The pivot member 72 is preferably cylindrical in shape and is sized to cooperate with the hinge mounting apertures 55a, having a diameter slightly smaller than the diameter of the mounting portion 57 of the hinge mounting aperture 55a. It will be appreciated that the armrest extension 31 may also have any other suitable pivot member configuration that permits the armrest extension 31 to be movably mounted to the lid 34 and to be disposed within the open cavity of the frame 50.

The support member 31a is preferably constructed from any suitable substantially rigid material, such as plastic. Examples of such suitable materials for the support member 31a include polypropylene, nylon, acrylonitrile butadiene styrene (ABS), and polycarbonate acrylonitrile butadiene styrene (PCABS). The support member 31a can be formed having any suitable thickness, and is preferably formed such that the support member 31a is approximately one half of the thickness of the forward frame portion 33. The reduced thickness of the support member 31a allows the support member 31a to fit within the notch 33a formed within the forward frame portion 33 without protruding above the upper surface of the forward frame portion 33.

The cushion portion 31b of the armrest extension 31 is preferably formed in the same manner as the armrest portion 52, including a body having a substrate formed of plastic material, such as acrylonitrile butadiene styrene (ABS) or glass-filled polypropylene, with an outer surface or skin covering the substrate. Preferably, the skin is formed of plastic material, such as vinyl or thermoplastic olefin (TPO). The cushion portion 31b is also preferably approximately the same thickness as the armrest portion 52 of the lid 34. It will be appreciated, however, that both the support member 31a and the cushion portion 31b may be constructed having any suitable dimensions, any suitable construction, and using any suitable materials other than the dimensions, construction, and materials discussed above.

The armrest extension 31 is preferably movably mounted within the lid 34 of the console 30, and is more preferably movably mounted within the frame 50 of the lid 34. FIGS. 6 and 7 show in detail the connection of the armrest extension 31 to the frame 50. In the illustrated embodiment, the pivot member 72 of the armrest extension 31 hingedly engages the hinge mounting apertures 55a in the side frame portions 55 of the frame 50. Specifically, the portions of the pivot member 72 that extend beyond the support surface 31b of the armrest extension 31 are pressure fit through the collar opening 58 of the hinge mounting aperture 55a and placed into the mounting portion 57 of the hinge mounting aperture 55a. The pressure or interference fit of the pivot member 72 through the collar opening 58 allows for a break away pivot position for the armrest extension 31 relative to the body 32 when an excessive amount of force is placed on the armrest extension 31. Thus, excessive force applied downwardly against the extension 31 while in the deployed position will not damage the console, but merely separate the extension 31 from the body 32. The extension can be simply placed back into position if broken away.

The armrest extension 31 of the console 30 is movable between a storage position and a deployed position. FIGS. 2 through 7 illustrate the armrest extension 31 in the storage position. In the storage position, the armrest extension 31 is disposed within a portion of the open cavity of the frame 50. The remainder of the opening in the frame 50 remains unobstructed and provides access to the compartment opening 42 in the body 32. Similarly, a portion of the cushion portion 31a may also be disposed within a portion of the compartment opening 42 of the body 32 when the armrest extension 31 is in the storage position, depending upon the thickness of the cushion portion 31a of the armrest extension 31. The support portion 31b rests upon the stop tab(s) 55b of the frame 50 in the storage position. As previously discussed, the stop tab(s) 55b of the frame may also be omitted, and the armrest extension may rest upon the inner surface of the forward portion 36 of the body in an alternate storage position as well.

To use the armrest extension 31 according to the present invention, the armrest portion 52 of the lid 34 is opened to expose the armrest extension 31. FIG. 4 illustrates the armrest portion 52 in the open position. To open the armrest portion 52 of the lid 34, the armrest latch 66 is released from the armrest latch aperture 70 using the armrest release 59. After the armrest portion 52 has been released from the frame 50 of the lid 34, the armrest portion 52 is rotated by way of the hinges 64 about the pivot axis B to open the armrest portion 52 and expose the armrest extension 31. In a preferred embodiment, the armrest portion 52 is pivotally connected and configured for operation by the driver of the vehicle; therefore, the armrest portion 52 is rotated clockwise about the pivot axis B to open the armrest portion 52 and expose the armrest extension 31.

Figure 5:
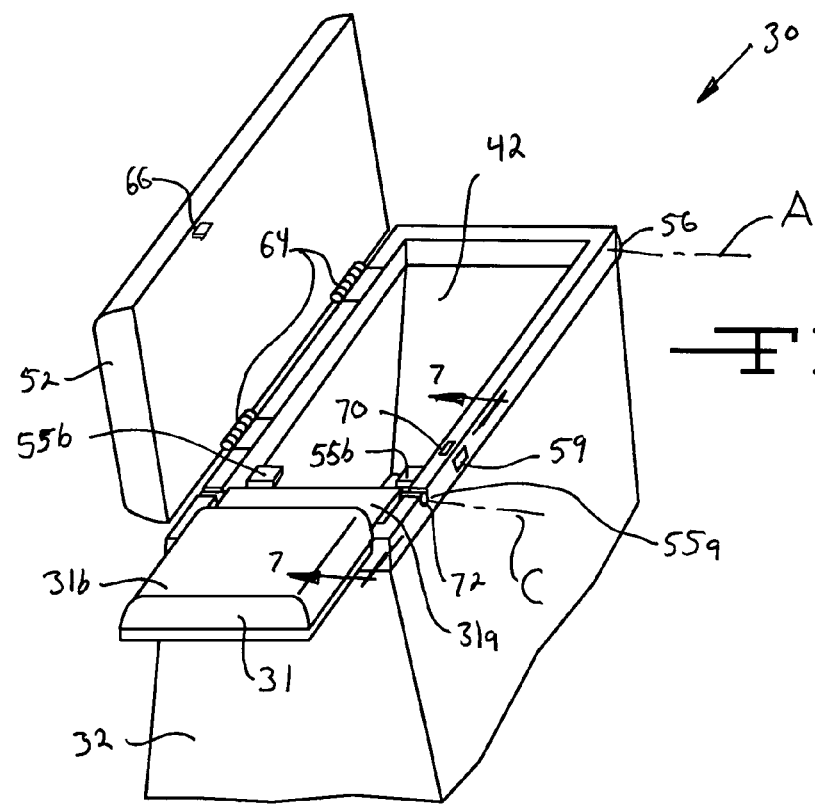
FIG. 5 is a front perspective view of the console according to the present invention illustrating the armrest extension in the deployed position.

FIG. 5 shows the armrest extension 31 in the deployed position. To deploy the armrest extension 31, the armrest extension 31 is rotated from its storage position within the open cavity of the frame 50. The armrest extension 31 is rotated approximately 180 degrees about a pivot axis C by rotating the pivot member 72 of the armrest extension 31 within the mounting portion 57 of the hinge mounting aperture 55a. The rotation of the armrest extension 31 results in the bottom surface of the support portion 31a of the armrest extension 31 resting upon the notch 53a in the forward frame portion 53 of the frame 50. After the armrest extension 31 has been deployed, the armrest portion 52 of the lid 34 can be rotated counterclockwise about the pivot axis B to close the lid 34 and cover the opening 42 of the body 32. Note that the closure of the lid helps maintain the extension 31 in the mounting apertures 55a due to the presence of the lid directly above the pivot member 72.

FIG. 8 illustrates the armrest extension 31 in the deployed position with the armrest portion 52 of the lid 34 closed. Because the thickness of the support portion 31a is generally approximately equal to the depth of the notch 53a in the forward frame portion 53 of the frame and because the thickness of the cushion portion 31b of the armrest extension is approximately equal to the thickness of the armrest portion 52, the cushion portion 31b of the armrest extension 31 is disposed generally co-planar to the armrest portion 52 of the lid 34 when the armrest extension 31 is in the deployed position. This co-planar relationship of the armrest extension 31 and the armrest portion 52 allows the driver and/or passenger to comfortably utilize the additional surface area provided by the armrest extension 31 as an armrest when the driver and/or passenger seats are adjusted to their forward positions. The orientation of the armrest extension 31 also allows the vehicle occupants to continue to have full access to the compartments and/or controls within the central panel 14, including the cup holders 19 and the parking brake control (not shown).

As previously mentioned, the hinge mounting apertures 55b for the armrest extension 31 have a break away pivot position feature. As best shown in FIG. 7, this break away feature is accomplished through the pressure mounting of the pivot member 72 of the armrest extension 31 through the collar opening 58 of the hinge mounting aperture 55b. As shown in phantom in FIG. 7, this feature enables a break away pivot position that allows the pivot member 72 to dislodge from the mounting portion 57 of the hinge mounting aperture 55b and release from the collar opening 58 when an excessive force is placed on the armrest extension 31. The release of the pivot member 72 from the hinge mounting apertures 55b causes the armrest extension 31 to be further rotated about the pivot axis C to a break away position. This break away feature provides a particular advantage in that it prevents breakage of the pivot member 72 and/or the armrest extension 31 or the components thereof under an excessive load.

Another particular advantage of the present invention is that the storage compartment opening 42 of the body 32 is accessible regardless of whether the armrest extension is in the storage or deployed position. FIG. 3 shows a first method of access where the entire lid assembly 34 (i.e. the frame 50 and the armrest portion 52) is pivotally opened about pivot axis A via the hinge 56. To open the entire lid assembly 34, the latch 46 is released from the latch aperture 44 using the release aperture 48. When the entire lid assembly 34, which includes the armrest extension 31, is raised, the user has full access to the compartment opening 42 of the console body 32. As shown in FIG. 9, the entire lid assembly 34 may also be opened in the same manner with the armrest extension 31 in the deployed position, also providing full access to the opening 42 of the console body 32. As shown in FIG. 4, releasing the armrest portion 52 of the lid 34 also provides access the opening 42. When only the armrest portion 52 is opened, the opening 42 of the body 32 is accessible through the portion of the open cavity of the frame 50 not filled by the stored armrest extension 31.

The principle and mode of operation of this invention have been described in its preferred embodiments. However, it should be noted that this invention may be practiced otherwise than as specifically illustrated and described without departing from its scope.

What is claimed is:

1. A console for a vehicle comprising:
   a body defining a compartment and an opening therein;
   a lid configured to cover the opening, wherein the lid includes an armrest portion and a frame, wherein the armrest portion pivotally connects to the frame, and wherein the frame pivotally connects to the body, and wherein the frame has an opening to provide access to the compartment; and
   a separate armrest extension movably mounted relative to the body and the lid, wherein the armrest extension is movable between a storage position and a deployed position.

2. The console according to claim 1, wherein the armrest extension includes a support member and a cushion portion.

3. The console according to claim 2, wherein in the deployed position the cushion portion of the armrest extension is disposed generally co-planar to the armrest portion of the lid.

4. The console according to claim 1, wherein the frame of the lid comprises a forward frame portion and a rearward frame portion connected by a pair of side frame portions, and wherein the armrest portion is pivotally connected to one of the side frame portions.

5. The console according to claim 4, wherein each of the side frame portions of the lid includes a hinge mounting aperture for pivotally receiving a pivot member of the armrest extension, wherein the hinge mounting aperture is located adjacent to the forward frame portion of the lid.

6. The console according to claim 5, wherein the hinge mounting apertures are shaped so as to allow a break away pivot position of the armrest extension relative to the body.

7. The console according to claim 1, wherein the frame of the lid defines an open cavity, and wherein the armrest extension is disposed within a portion of the cavity when the armrest extension is in the storage position.

8. The console according to claim 1, wherein the body includes a forward portion and a rearward portion, and the lid is pivotally connected adjacent the rearward portion of the body.

9. The console according to claim 1, wherein at least a portion of the armrest extension is disposed within the opening defined by the body when the armrest extension is in the storage position.

10. The console according to claim 1, wherein the lid includes at least one stop tab to support the armrest extension in the stored position.

11. The console according to claim 1, wherein the frame includes at least one stop tab located on one of the side frame portions to support the armrest extension in the stored position.

12. A console for a vehicle comprising:
a body defining a compartment and an opening therein;
a lid pivotally connected to the body, the lid including an armrest portion and a frame, the frame being pivotally connected to the body, and the armrest portion being pivotally connected to the frame, and wherein the frame has an opening to provide access to the compartment; and
a separate armrest extension movably mounted on the lid, wherein the armrest extension is movable between a storage position and a deployed position extending outwardly from the body.

13. The console according to claim 12, wherein the armrest extension is movably mounted on the frame.

14. The console according to claim 13, wherein the armrest extension is pivotally mounted on the frame.

15. The console according to claim 12, wherein the armrest extension is pivotally mounted on the lid.

16. The console according to claim 12, wherein the lid includes at least one stop tab to support the armrest extension in the stored position.

17. A console for a vehicle comprising:
a body defining a compartment and an opening therein;
a lid configured to cover the opening, wherein the lid includes an armrest portion and a frame, wherein the armrest portion pivotally connects to the frame, wherein the frame pivotally connects to the body; and
a separate armrest extension movably mounted relative to the body and the lid, the armrest extension including a support member and a cushion portion, wherein the armrest extension is movable between a storage position and a deployed position, wherein in the deployed position the cushion portion of the armrest extension is disposed generally co-planar to the armrest portion of the lid.

18. A console for a vehicle comprising:
a body defining a compartment and an opening therein;
a lid configured to cover the opening, wherein the lid includes an armrest portion and a frame, wherein the frame of the lid comprises a forward frame portion and a rearward frame portion connected by a pair of side frame portions, the armrest portion being pivotally connected to one of the side frame portions, the frame being pivotally connected to the body; and
a separate armrest extension movably mounted relative to the body and the lid, wherein the armrest extension is movable between a storage position and a deployed position, wherein each of the side frame portions of the lid includes a hinge mounting aperture for pivotally receiving a pivot member of the armrest extension, wherein the hinge mounting aperture is located adjacent to the forward frame portion of the lid.

19. A console for a vehicle comprising:
a body defining a compartment and an opening therein;
a lid configured to cover the opening, wherein the lid includes an armrest portion and a frame, wherein the armrest portion pivotally connects to the frame, and wherein the frame pivotally connects to the body; and
a separate armrest extension movably mounted relative to the body and the lid, wherein the armrest extension is movable between a storage position and a deployed position, wherein the frame of the lid defines an open cavity, and wherein the armrest extension is disposed within a portion of the cavity when the armrest extension is in the storage position.

* * * * *